US005848763A

United States Patent [19]

Mitchell et al.

[11] Patent Number: 5,848,763

[45] Date of Patent: Dec. 15, 1998

[54] RETRO-ENCODED MISSILE GUIDANCE SYSTEM

[75] Inventors: Robert R. Mitchell; Walter E. Miller, both of Huntsville, Ala.

[73] Assignee: The United States of America as represented by the Secretary of the Army, Washington, D.C.

[21] Appl. No.: 937,246

[22] Filed: Sep. 3, 1997

[51] Int. Cl.[6] .......... F41G 7/26

[52] U.S. Cl. .......... 244/3.11; 244/3.13

[58] Field of Search .......... 244/3.11, 3.13; 356/152.3; 250/236

[56] References Cited

U.S. PATENT DOCUMENTS

| | | | |
|---|---|---|---|
| 3,366,346 | 1/1968 | McKnight et al. | 244/3.11 |
| 3,501,113 | 3/1970 | Maclusky | 244/3.13 |
| 3,690,594 | 9/1972 | Menke | 244/3.13 |
| 3,773,421 | 11/1973 | Gievers | 356/152.3 |
| 3,796,396 | 3/1974 | Crovella | 244/3.14 |
| 4,014,482 | 3/1977 | Esker et al. | 244/3.13 |
| 4,027,837 | 6/1977 | Miller, Jr. et al. | 244/3.16 |
| 4,202,515 | 5/1980 | Maxwell, Jr. | 244/3.11 |
| 4,399,961 | 8/1983 | Mitchell | 244/3.13 |
| 4,433,818 | 2/1984 | Coffel | 244/3.13 |
| 4,611,771 | 9/1986 | Gibbons et al. | 244/3.12 |
| 4,967,979 | 11/1990 | Balstad | 244/3.11 |
| 5,348,249 | 9/1994 | Gallivan | 244/3.11 |
| 5,651,512 | 7/1997 | Sand et al. | 244/3.11 |

*Primary Examiner*—Charles T. Jordan

*Assistant Examiner*—Christopher K. Montgomery

*Attorney, Agent, or Firm*—Hugh P. Nicholson; Freddie M. Bush; Hay Kyung Chang

[57] ABSTRACT

The retro-encoded guidance system guides a flying object in its flight toward its destination by measuring and correcting the angular displacement of its actual trajectory from the straight line-of-sight to the destination. A beam of infrared light emanating from a beacon on the flying object is received and angularly encoded by retro-encoder located at the launcher prior to being returned to the missile. The incident beam and returned beam travel on optical paths that are parallel to each other but opposite in direction. The angular encoding is achieved by a reticle of the retro-encoder imparting frequency modulation to the incident beam, the degree and phase of the modulation depending on the location on the reticle on which the beam is incident.

7 Claims, 4 Drawing Sheets

A
B
A
B
201
107
203
B'
A'
401

RETRO-ENCODED MISSILE GUIDANCE SYSTEM

DEDICATORY CLAUSE

The invention described herein may be manufactured, used and licensed by or for the Government for governmental purposes without the payment to us of any royalties thereon.

BACKGROUND OF THE INVENTION

At present, unguided rockets are commonly used where a high level of accuracy is not required and low cost is desired. Where increased accuracy is needed, however, some form of guidance is utilized with the accompanying large increase in size of the rocket and cost. Between no guidance and full (i.e. expensive) guidance, there is a middle ground where some accuracy can be had at a relatively modest cost.

One of the oldest forms of missile guidance is called command-to-line-of-sight (CLOS). The missile angular error from a desired flight path is measured by a launcher-mounted goniometer and collection commands are calculated and sent to the missile over a command link, commonly a wire. This has the advantage of missile-mounted hardware simplicity but can be susceptible to disruption by false missile signals transmitted from the target area. A more modern approach to guidance is the beamrider guidance. In this approach, a beam carrying angular encoding information is transmitted from the launcher along a line to the target such that an aft-facing receiver on the missile can measure the position of the missile within the beam and calculate its own corrections to fly down the center of the beam. This is simpler and less susceptible to disruption but is clearly more detectable by simple receivers on the target, thereby allowing possible evasion.

SUMMARY OF THE INVENTION

A flying object, such as a missile, is guided along a straight line to its destination, such as a target, by the measurement and correction of the displacement of its actual trajectory from that straight line. This is accomplished by causing light from a beacon on the flying object's aft end to be received and angularly encoded by a launcher-mounted retro-encoder unit prior to being reflected back to the object (ex. missile). The retro-encoder reflects the light only back to the missile, the source of the light, the light now carrying modulation that is dependent on the angular position of the missile relative to the straight line to the target. The aft-looking receiver located on the missile detects the reflected light and converts the modulation into displacement error. The missile then maneuvers itself to minimize this error.

DESCRIPTION OF THE PREFERRED EMBODIMENT

Figure 1:
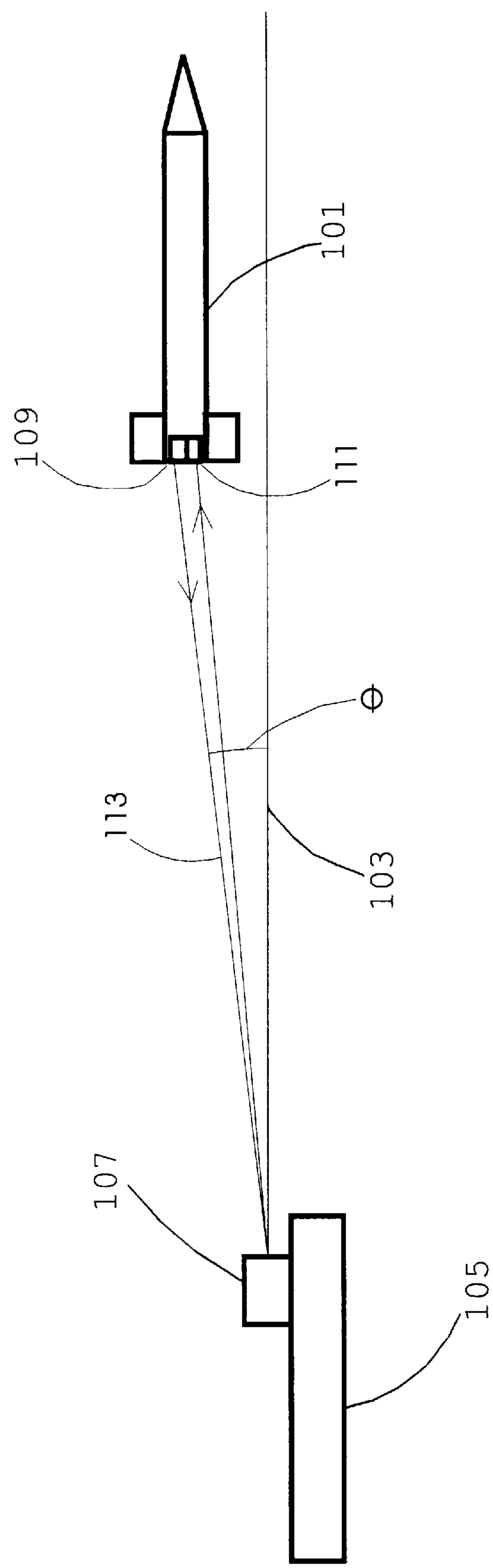
FIG. 1 illustrates the overall operation of the retro-encoded guidance system.
Figure 2:
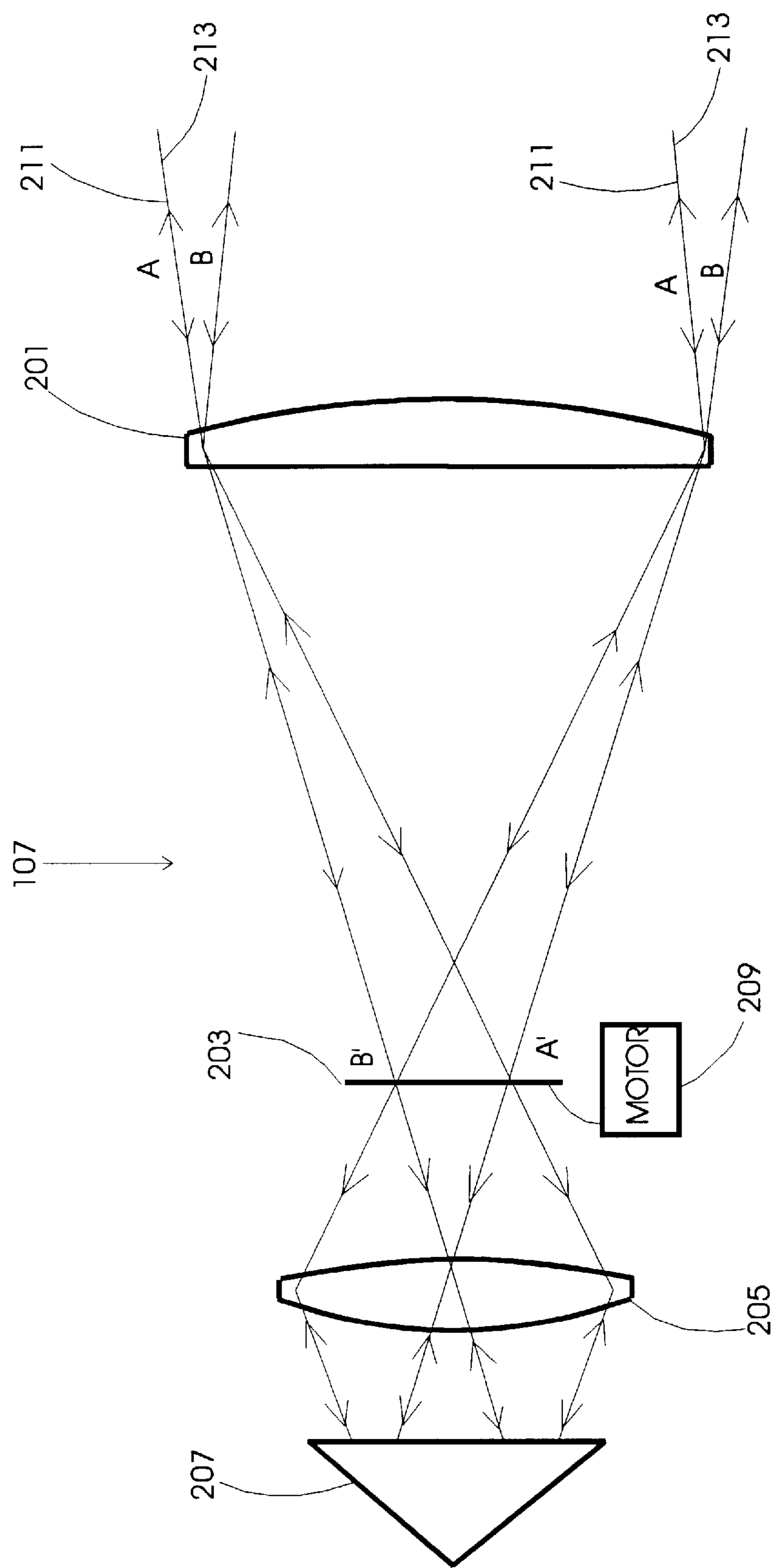
FIG. 2 shows the preferred embodiment of the retro-encoder.
Figure 3:
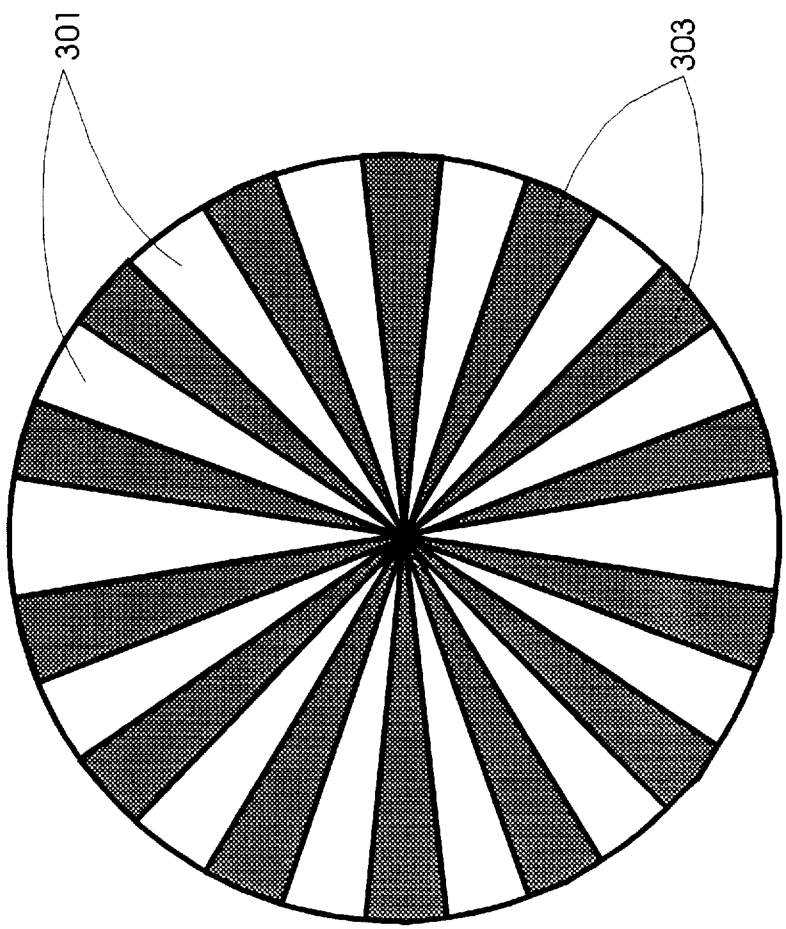
FIG. 3 illustrates a nutated fan blade reticle.

Referring now to the drawing wherein like numbers represent like parts in each of the several figures, FIG. 1 shows missile 101 flying toward a target (not shown) along its trajectory 113 after being launched from launcher 105. Trajectory 113 is offset from straight line-of-sight 103 to the target by angular error θ. While the missile flies toward the target, aft-facing beacon 109 mounted at the rear of the missile emits an optical beam toward launcher 105 where the beam is received by retro-encoder 107. The optical beam preferably is infrared light to avoid visual detection and achieve better penetration through smoke and haze. The beam pattern must also be wide enough to encompass the launcher for all possible missile maneuvers. As depicted in detail in FIG. 2 where lines with arrow heads indicate optical paths, the portion of the infrared beam incoming from beacon 109 via first optical path 211 and is incident on objective lens 201 is focussed to a point on reticle 203. All rays in parallel bundle AA fall on point A' on the reticle while rays in parallel bundle BB fall on point B' on the reticle, points A' and B' indicating different locations on reticle 203. The reticle may be of various designs but a commonly used configuration is the nutated fan blade reticle illustrated in FIG. 3. It has equi-spaced transmissive radial sectors 301 which alternate with absorptive radial sectors 303. The reticle, which is driven by motor 209 at a constant given rotation per minute, imparts frequency modulation to the infrared light incident on the reticle, the degree and phase of the modulation being a function of the location on the reticle on which the light is incident. The infrared light that falls on transmissive sectors 301 diverges as it continues to travel to recollimating lens 205 which, being functionally equivalent to an eyepiece lens in a telescope, forms parallel bundles of rays for each focussed point on reticle 203. The parallel bundles of rays are then incident on retro-reflector 207 which is appropriately sized and placed so as to intercept all of these parallel bundles. A retro-reflector is a commonly used prismatic optical element that has the unique property of reflecting an optical ray back parallel to the incident ray. Hence, any bundle of rays passing through a point, such as A' or B' on the reticle, is reflected by retro-reflector back to the same point and, thence, through objective lens 201, via second optical path 213 which is parallel to first optical path 211, ultimately back to the missile from which the original infrared beam emanated. (In the figure, even though optical paths 211 and 213 are shown by the same line, they are different but parallel paths propagating in opposite directions.) Therefore, the only rays which reflect back in the general direction of the target go directly to the missile in a very narrow beam and are unlikely to be detectable by the target. Further, false missile signals generated by the target to attempt to disrupt the missile guidance return not to the missile receiver, but to the false signal source, thus having no ill effect on guidance. The encoded (modulated) beam returning to missile 101 via second optical path 213 is received by aft-looking receiver 111 on the missile. The receiver, then, detects and analyzes the frequency modulation imparted by the reticle onto the retro-reflected beam and determines the angular error θ of the missile's actual trajectory relative to target line-of-sight 103. The angular error information is used by steering mechanism (not shown) of the missile to maneuver the missile to fly closer to the line-of-sight, thereby minimizing the error.

Figure 4:
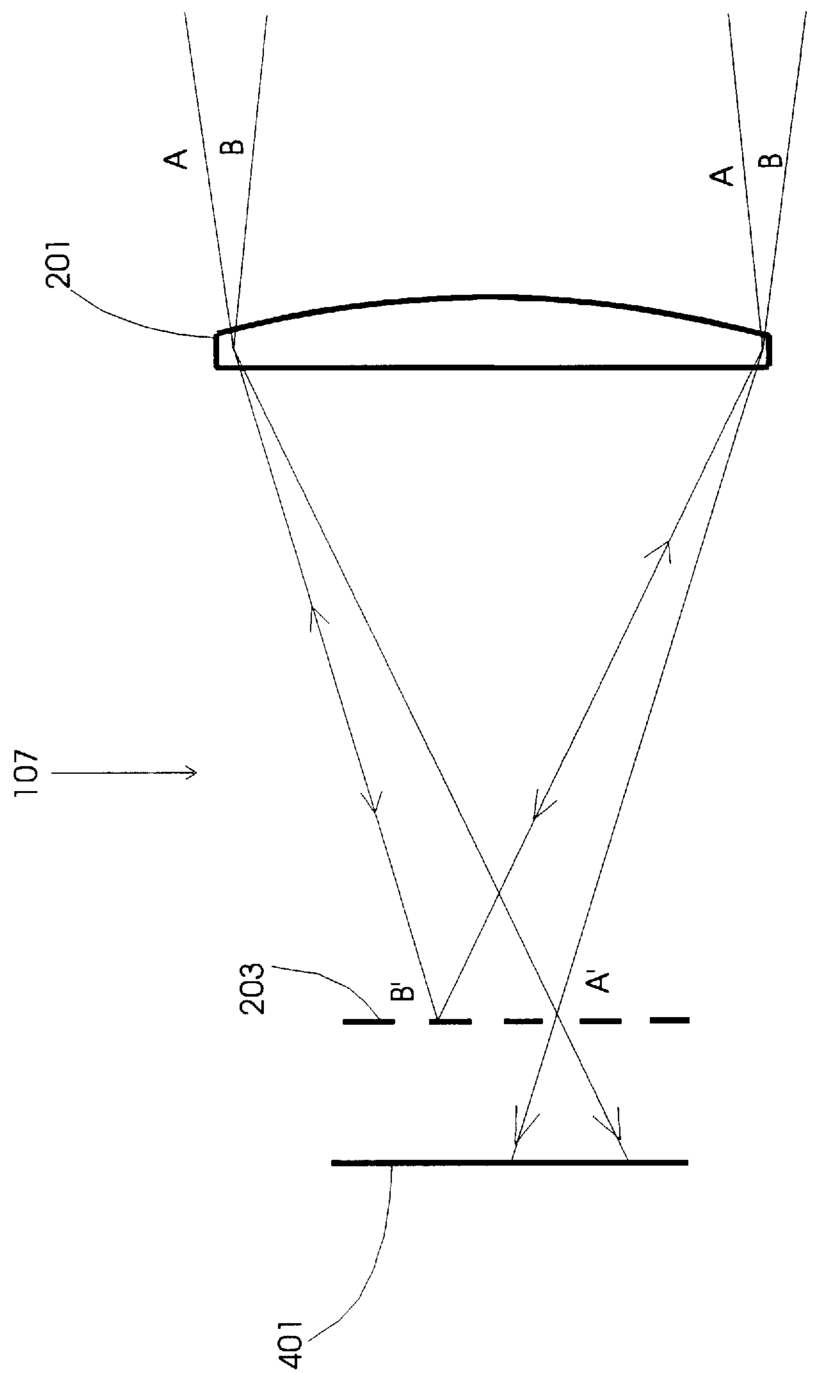
FIG. 4 depicts an alternate embodiment of the retro-encoder.

FIG. 4 shows another embodiment of retro-encoder 107. This embodiment utilizes the well-known fact that if a reflective surface is placed at the focal plane of an objective lens, the lens/surface combination acts like a retro-reflector. Sometimes called "cat's-eye retro-reflection," this occurs because any light ray which is reflected from a point on a focal plane back through the focussing lens returns opposite but parallel to the incident ray. This effect can be exploited by making the radial sectors of reticle 203 reflective rather than transmissive, such that rays in parallel bundle BB all are incident at reflective point B' on the reticle, as illustrated in FIG. 4. All rays reflected from point B', if they reach objective lens 201, return parallel to the input bundle BB. Rays which focus on the "dark" portions (A') of the reticle are either absorbed by a low reflectivity coating or pass through transparent reticle spaces and are trapped and absorbed by absorbing surface 401 behind the reticle. Rays which are incident at the more off-axis points on the reticle are subject to blockage by failing to reflect back to the objective lens, but this is generally an insignificant effect. The embodiment of FIG. 4, therefore, functions very similarly to the preferred embodiment of FIG. 2, but has fewer optical components and should be lower in cost.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

We claim:

1. A retro-encoded guidance system for guiding a flying object to have a more direct trajectory toward its destination after being launched from a launcher, said system comprising: a retro-encoder mounted on the launcher; a beacon mounted on the flying object, said beacon facing aft and emitting an optical beam to travel via a first optical path to be incident on said encoder, said encoder being comprised of a rotatable-mounted reticle, said reticle selectively passing therethrough a portion of said optical beam impinging thereon, an objective lens to receive said optical beam incident thereon via said first optical path from said beacon and focus said beam onto said reticle, a retro-reflector, a recollimating lens positioned to receive said portion passing through said reticle and re-collimate said portion and further transmit said portion to impinge on said retro-reflector, said reflector being adapted for reflecting an incidend optical beam such that upon reflection, said optical beam travels via a second optical path, said first and second paths being parallel to each other but propagating in opposite directions; and a receiver located on the flying object to receive said returned beam via said second optical path and, in response to said returned beam, generate correctional signals sufficient to cause the flying object to move closer to the line-of-sight for a more direct arrival at the destination.

2. A retro-encoded guidance system as set forth in claim 1, wherein said reticle comprises a plurality of transmissive and absorptive sections, said transmissive and absorptive sections alternating with each other.

3. A retro-encoded guidance system as set forth in claim 2, wherein said transmissive and absorptive sections are equi-spaced radial sectors.

4. A retro-encoded guidance system as set forth in claim 3, wherein said system further comprises a motor coupled to rotate said reticle at a pre-determined rotation-per-minute such that said reticle imparts a frequency modulation onto said optical beam incident on said reticle, the degree and phase of said frequency modulation depending on the location on said reticle on which said optical beam is incident.

5. A retro-encoded guidance system as set forth in claim 4, wherein said retro-reflector is a prism.

6. A retro-encoded guidance system as set forth in claim 5, wherein said optical beam is wide enough to encompass the launcher within the perimeter of said beam for all possible maneuvers of the flying object.

7. A retro-encoded guidance system for guiding a flying object to have a more direct trajectory toward its destination after being launched from a launcher, said system comprising: a retro-encoder mounted on the launcher and adapted for imparting to an incident optical beam angular encoding information indicative of the angle between the trajectory of the flying object and the line-of-sight from the launcher to the destination; a beacon mounted on the flying object, said beacon facing aft and emitting an infrared beam of a pre-selected diameter to travel via a first optical path to be incident on said encoder, said encoder being further adapted for returning said beam to the flying object via a second optical path, said first and second paths being parallel to each other but propagating in opposite directions, said encoder having a rotatably-mounted nutated fan-blade reticle composed of reflective blades, an objective lens for receiving said infrared beam emitted by said beacon and focussing said infrared beam to be incident on said reticle, said reticle being positioned at the focal plane of said objective lens and an absorbing surface placed such that any of said infrared beam transmitted through said reticle is incident on and absorbed by said surface; and a receiver located on the flying object, said receiver being capable of receiving said returned beam and determining the position of the flying object within the diameter of said beam and generating, in response thereto, corresponding correctional signals that are sufficient to cause the flying object to move closer to the line-of-sight from the launcher to the destination for a more direct impact on the destination.

* * * * *